United States Patent [19]

Komurasaki et al.

[11] 4,409,943
[45] Oct. 18, 1983

[54] IGNITION TIMING CORRECTING SYSTEM FOR INTERNAL COMBUSTION ENGINE

[75] Inventors: Satoshi Komurasaki; Atsushi Ueda; Tsuneo Yamane, all of Himeji, Japan

[73] Assignee: Mitsubishi Denki Kabushiki Kaisha, Tokyo, Japan

[21] Appl. No.: 421,581

[22] Filed: Sep. 22, 1982

Related U.S. Application Data

[63] Continuation of Ser. No. 249,457, Mar. 31, 1981, abandoned.

[30] Foreign Application Priority Data

Apr. 3, 1980 [JP] Japan ............................ 55-44407

[51] Int. Cl.³ .............................................. F02P 5/04
[52] U.S. Cl. ............................... 123/418; 123/625; 123/424; 123/406
[58] Field of Search ................ 123/418, 424, 625, 406

[56] References Cited

U.S. PATENT DOCUMENTS

| | | | |
|---|---|---|---|
| 3,815,560 | 6/1974 | Wahl et al. | 123/418 |
| 3,990,417 | 11/1976 | Tershak | 123/418 |
| 4,079,709 | 3/1978 | Schuette | 123/418 |
| 4,142,489 | 3/1979 | Menard | 123/418 |
| 4,373,487 | 2/1983 | Komurasaki et al. | 123/418 |

FOREIGN PATENT DOCUMENTS 2636235  3/1977  Fed. Rep. of Germany ...... 123/418

Primary Examiner—Raymond A. Nelli
Attorney, Agent, or Firm—Wenderoth, Lind & Ponack

[57] ABSTRACT

An ignition timing correcting system for generating a reference signal at a reference angular position of a rotating internal combustion engine, and having an ignition signal leading it by a constant phase. In response to a control signal from a movable tap on a potentiometer, the ignition signal is retarded in phase to form a retarded ignition signal. The phase comparison of the two signals produces an advance or a retardation signal formed of a pulse train having a pulse width corresponding to the phase difference there-between. During the idling of the engine, the correcting signal drives an electric reversible motor in either a forward or reverse direction so as to move the tap on the potentiometer to adjust the control signal after the correcting signal has been converted to a driving pulse having a longer pulse width when correcting in a direction to correct an advance of said signal than the pulse width when correcting in a direction to correct a retardation of said signal with respect to the phase difference.

4 Claims, 7 Drawing Figures

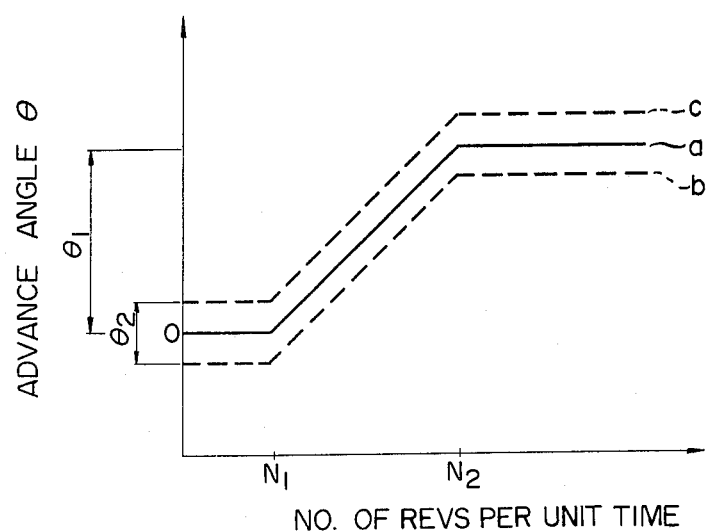
FIG. 1
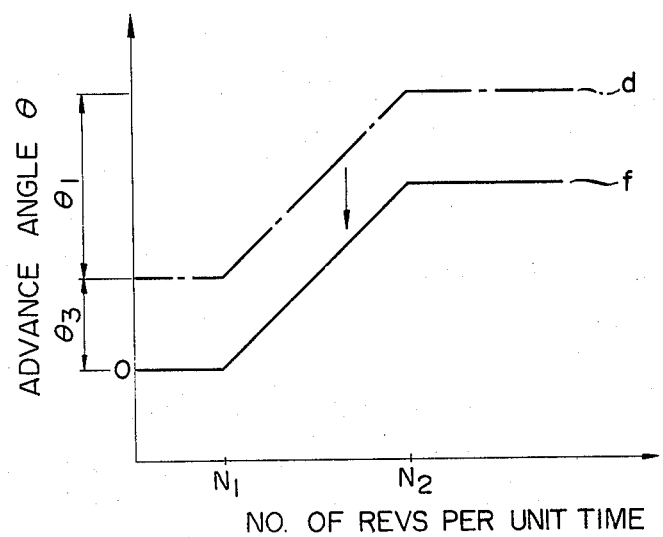
FIG. 2
FIG. 6
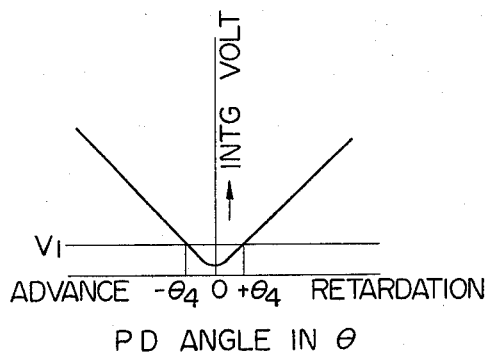
FIG. 7
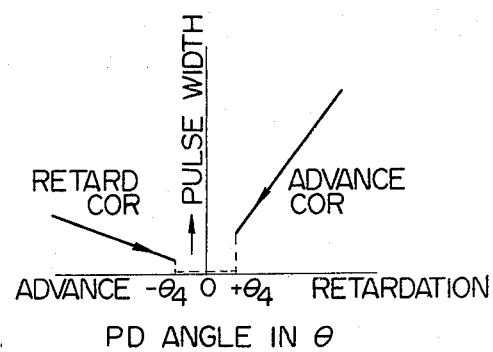

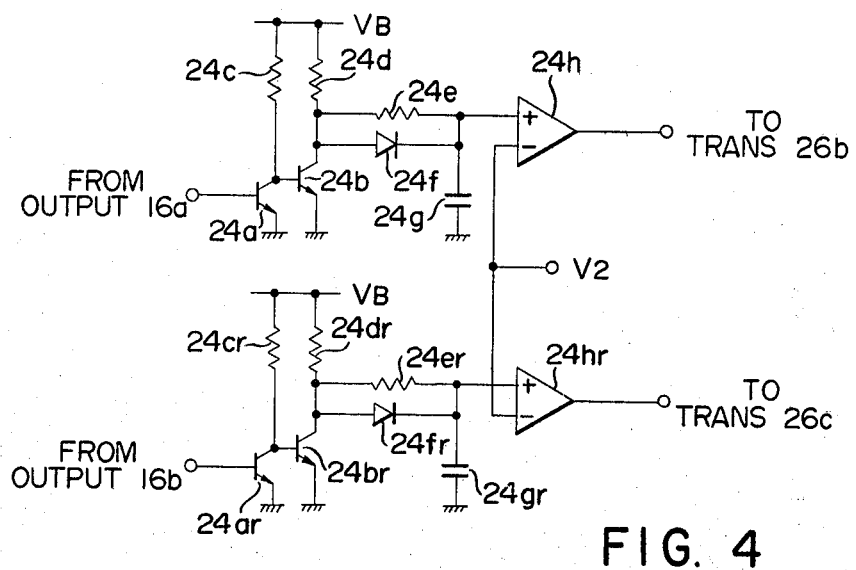
FIG. 4
FIG. 5
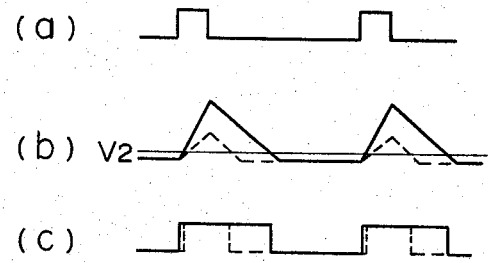

4,409,943

IGNITION TIMING CORRECTING SYSTEM FOR INTERNAL COMBUSTION ENGINE

This application is a continuation of now abandoned application Ser. No 249,457 filed Mar. 31, 1981.

BACKGROUND OF THE INVENTION

The present invention relates to a system for correcting a shift of an ignition timing occurring in the ignition device used with internal combustion engines.

In recent years, ignition devices used with motor vehicles have been and are being required to have increased output energy and have both improved accuracy and stability of the ignition timing in view of the purification required for the exhaust gases from motor vehicles. Under these circumstances, ignition devices of the convention contact breaker type are increasingly replaced by those of the fully transistorized type without contact breakers.

In this fully transistorized type of ignition device, the ignition timing signal is provided by a contactless signal generator such as an electromagnetic coil generator, an integrated circuit Hall generator or the like. However, such a generator is disposed within a mating distributor which is, in turn, usually driven by a crank shaft connected to an associated internal combustion engine through a timing belt or the like. Even in fully transistorized ignition devices, therefore, a shift of the ignition timing due to ageing changes in the distributor driving system increases with time. Thus, deviations of the ignition timing signal from its normal position in each cycle of the internal combustion engine due to various causes would increase and become more apparent as time goes on. This has been attributed to, for example, the ageing of a distribution driving mechanism involved. This shift of the ignition timing appears as a shift of the ignition timing developed during the idling of the engine and has greatly affected the output from the engines and the ingredients of the exhaust gases from the engine.

Therefore, the shift of the ignition timing is undesirable in view of measures to purify the exhaust gases from internal combustion engines. Thus, it is desirable to correct a shift of the ignition timing of internal combustion engines by some measure.

SUMMARY OF THE INVENTION

Accordingly, it is an object of the present invention to provide an ignition timing signal generator or an ignition timing controller which is capable of automatically correcting deviations of an ignition timing from its normal position in each cycle of an internal combustion engine involved.

It is another object of the present invention to provide a new and improved system for correcting an ignition timing of an internal combustion engine by eliminating the necessity of adjusting the initial ignition timing and also corrects shifts of the ignition timing due to an ageing change by enabling the correction during the normal mode of operation of the internal combustion engine through the use of a control magnitude stored in a memory means.

It is still another object of the present invention to provide a new and improved system for correcting an ignition timing of an internal combustion engine with a high accuracy, in which a closed loop control system for correcting the ignition timing has a control gain on the advance control and another control gain different from the first-mentioned control gain on the retardation control so that the control is always effected in a predetermined single direction immediately before the control converges, whereby a phase difference between a reference signal and a retarded ignition signal is permitted to vary within a narrow range at a point of convergence of the control.

The present invention provides an ignition timing correcting system for an internal combustion engine comprising reference generator means for generating a pulsed reference signal at a reference angular position of the rotation of an internal combustion engine, and ignition generator means for generating a pulsed ignition timing signal at an angular position of the rotation of the engine leading that for the pulsed reference signal, wherein the pulsed ignition timing signal has a predetermined advance characteristic. A phase shifter means is connected to the ignition generator means to retard the pulsed ignition timing signal in response to a control input applied thereto to produce an output, and ignition means is connected to the phase shifter means to generate a pulsed ignition voltage in response to the output from the phase shifter means. A memory means is disposed so as to generate a control signal which is applied to the phase shifter means to determine the retardation of the ignition signal provided by the phase shifter. The present invention further comprises control means for controlling the magnitude of the control signal in response to the phase relationship between the reference signal and the output from the phase shifter means so as to impart to the output from the phase shifter a predetermined phase relative to the reference signal in a predetermined mode of operation of the internal combustion engine. The control means has a first control gain when the control is effected in a direction to increase the retardation of the ignition signal effected by the phase shifter mean, and a second control gain which is different from the first control gain when the control is effected in a direction to decrease the retardation of the ignition signal.

BRIEF DESCRIPTION OF THE DRAWINGS

The present invention will become more readily apparent from the following detailed description taken in conjunction with the accompanying drawings in which:

FIG. 1 is a graph illustrating the centrifugal advance characteristic of the ignition time previously developed in interval combustion engines;

FIG. 2 is a graph similar to FIG. 1 is useful in explaining the fundamental principles of the present invention;

FIG. 4 is a circuit diagram of the details of the phase-width correction circuit shown in FIG. 3;

FIG. 5 is a graph illustrating waveforms developed at various points in the arrangement shown in FIG. 4; and FIGS. 6 and 7 are graphs illustrating the dynamic characteristics of the arrangement shown in FIG. 4.

DESCRIPTION OF THE PREFERRED EMBODIMENTS

Figure 3:
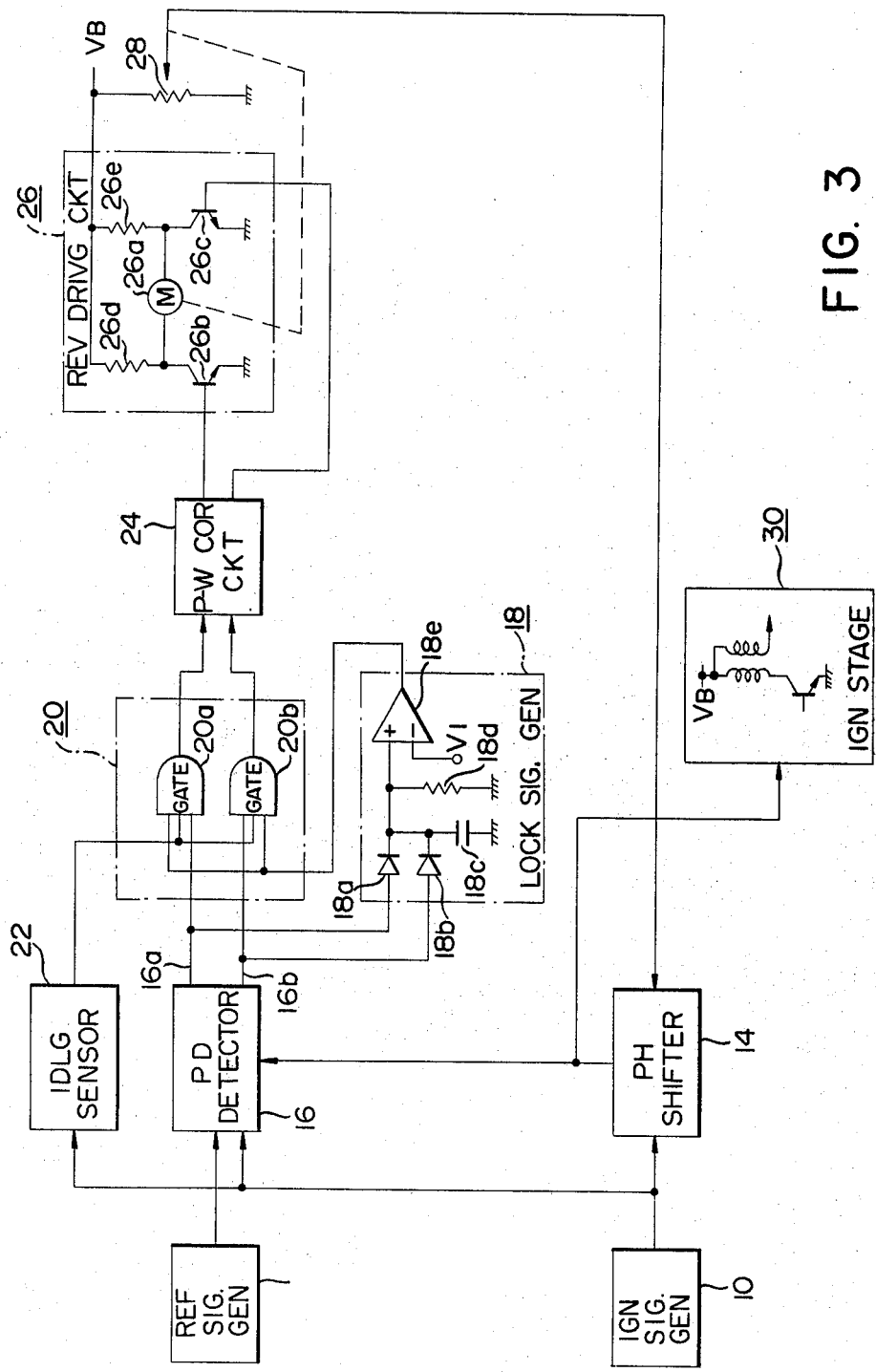
FIG. 3 is a combined circuit and block diagram of one embodiment according to the ignition timing correcting signal system of the present invention used with internal combustion engines.

For a better understanding of the nature of the present invention, a shift of an ignition timing will now be described in conjunction with FIG. 1 wherein there is illustrated the centrifugal advance characteristic of the ignition timing. In FIG. 1, the axis of ordinate represents an advance angle $\theta$ of an ignition timing and the axis of abscissa represents the number of revolution per unit time of an interval combustion engine. Solid line a designates the regular advance characteristics of the ignition timing and dotted lines b and c located below and above the solid line a respectively designate the advance characteristics of the ignition timing shifted respectively to the retarding and advancing sides due to an ageing change in an associated system for driving a distributor.

In the early days of any internal combustion engine, the ageing change results in the ignition timing having a null shift. Therefore, during the start or idling of the engine having the number of revolutions per unit time of $N_1$ or less, the ignition timing is of a reference magnitude or a null advance angle as shown at solid line a shown in FIG. 1. As the number of revolutions per unit time of the engine rises from its magnitude $N_1$, the ignition timing advances until the ignition timing reaches a maximum angle $\theta_1$ at the number of revolutions per unit time $N_2$ of the engine as shown at solid line a in FIG. 1. Thereafter, the ignition timing is held at the maximum angle $\theta_1$ as shown also at solid line a in FIG. 1 until the engine reaches a maximum number of revolutions per unit time.

However, the longer the service of the engine the more the ignition timing is shifted due to the ageing change as described above.

On the other hand, the machining accuracy of distributors and interval combustion engines may result in the initial shift of the ignition timing or the initial adjustment. This initial shift of the ignition timing has been generally corrected by adjusting an angular position of the distributor relative to a reference. To this end, a mounting for the distributor is designed and constructed so that it is rotatable. Such a construction is convenient for the official checkout of motor vehicles whereas it may cause a danger that the ignition timing is intentionally put out of order. This has resulted in the deterioration in the purity of the exhaust gases from interval combustion engines.

Various factors as described above have caused the ignition timing to be shifted as shown at dotted line b or c in FIG. 1. The shift $\theta_2$ of the ignition timing as shown in FIG. 1 is undesirable in view of measures to reduce the undesirable products of the exhaust gases and it is necessary to correct the shift of the ignition timing according to some measure.

FIG. 2 shows the centrifugal advance characteristics useful in explaining the fundamental principles of the present invention. In FIG. 2, the axis of the ordinate represents an advance angle $\theta$ of the ignition timing of an associated internal combustion engine and the axis of the abscissa represents the number of revolutions per unit time of the engine as in FIG. 1. Broken line d designates the advance characteristics of ignition timing signals obtained with an ignition generator disposed within an associated distributor and leading the desirable regular advance characteristic designated by the solid line f by a constant angle $\theta_3$. Thus, by regarding the ignition timing signal by the constant angle $\theta_3$ over the entire range of rotation of the internal combustion engine, the advance characteristic d can result in the regular advance characteristic f as shown by the solid line in FIG. 2.

More specifically, the present invention is arranged to generate from an ignition signal generator a pulsed ignition signal having a phase leading a regular phase by more than the width of variations in ignition timing so as to sense a phase difference of the ignition timing signal relative to the regular phase, for example, during the idling of an associated internal combustion engine and store it in a suitable memory means. The width of variations in ignition timing corresponds to an initial shift or adjustment angle due to the machining accuracy of the internal combustion engine and an associated distributor and an varied angle due to an ageing change in the internal combustion engine. The stored phase difference is used to retard the ignition timing signal to the regular phase so as to thereby correct the ignition timing.

Referring now to FIG. 3, there is illustrated one embodiment according to the ignition timing correcting system of the present invention used with internal combustion engines. The illustrated arrangement comprises an ignition signal generator 10 disposed within an associated distributor (not shown), a reference signal generator 12 disposed on a crank shaft for an associated internal combustion engine, a phase shifter 14 connected to the ignition signal generator 10, and a phase difference detector 16 connected to the ignition and reference signal generators 10 and 12 respectively and also to the phase shifter 14. The phase difference detector 16 includes a pair of outputs 16a and 16b connected to both a lock signal generator generally designated by the reference numeral 18 and a gate circuit generally designated by the reference numeral 20 to which the lock signal generator 18 is also connected. The ignition signal generator 10 is also connected to an idling sensor 22.

As shown in block 18, the lock signal generator 18 includes a pair of semiconductor diodes 16a and 16b having respective anode electrodes connected to the outputs 16a and 16b of the phase difference detector 16 and respective cathode electrodes connected together to ground through a capacitor 18c and a resistor 18d forming an integrating circuit. The cathode electrodes of those diodes 18a and 18b are also connected to the positive input of a comparator 18e which has its negative input connected to a bias voltage $V_1$.

As shown in block 20, the gate circuit 20 includes a pair of "AND" gates 20a and 20b each having a first input connected to the output 16a or 16b of the phase difference detector 16, a second input connected to the idling sensor 22 and a third connected to the output of the comparator 18e in the lock signal generator 18.

The gate circuit 20 includes a pair of outputs connected to respective inputs to a pulse-width correction circuit 24 subsequently connected to a reversible driving device generator designated by the reference numeral 26.

The reversible driving device 26 is shown in block 26 as including an electric reversible motor 26a, a pair of common emitter NPN transistors 26b and 26c having respective base electrodes connected to a pair of outputs of the pulse-width correction circuit 24 and respective collector electrodes connected across the reversible motor 26a. The collector electrodes of the transistors 26b and 26c are also connected via respective collector resistors 26d and 26e to a variable resistor, in this case, a potentiometer 28. The potentiometer 28 is also connected across a voltage point $V_B$ and ground and includes a movable tap which is controlled by the reversible motor 26a and which is connected to the phase shifter 14. The phase shifter 14 is further connected to an ignition stage generally designated by the reference numeral 30 and shown as including a well known ignition coil and a well known common emitter NPN transistor serving as a switch and connected to a primary winding of the ignition coil which is, in turn, connected to a voltage point $V_B$.

The arrangement of FIG. 3 is operated as follows: The ignition signal generator 10 generates an ignition signal having the advance characteristic (see the broken line d, in FIG. 2) dependent upon the number of revolutions per unit time of the internal combustion engine. The ignition signal is applied to the phase shifter 14 where the phase thereof is retarded in accordance with a control input or a control signal from the movable tap on the potentiometer 28 to produce a retarded ignition signal. The phase shifter 14 is, for example, operative to charge and discharge a capacitor (not shown) having a constant current which is dependent upon the control input applied thereto within each time period of the ignition signal, to invert from one to the other of the charging and discharging upon a voltage across the capacitor reaching a predetermined level, and to make this inversion timing a retardation timing to thereby control the retardation of the ignition signal in response to the control input. The retarded ignition time signal is applied to both the ignition stage 30 and the phase difference detector 16.

The ignition stage 30 is responsive to the retarded ignition signal to produce an ignition voltage.

On the other hand, the reference signal generator 12 senses a reference angular position of the crank shaft to generate a pulsed reference signal at a predetermined angular position which remains unchanged with respect to the rotation of the internal combustion engine. The regular angular position is determined to correspond to an angular position where the engine is required to ignite in the idling mode of operation. Therefore, the reference signal serves as a reference for the correction of an ignition timing. The reference and retarded ignition signals are supplied to the phase difference detector 16 which, in turn, senses a phase difference between the retarded ignition signal and the reference signal to produce an advance or a retardation correcting signal as the case may be, formed of a pulse train having a pulse width corresponding to the sensed phase difference. The advance or retardation correcting signal is delivered to the output 16a or 16b of the phase difference detector 16 respectively.

The lock signal generator 18 receives the correcting signal from the phase difference detector 16 to produce an output only when the correcting signal has a pulse-width which is not less than a predetermined magnitude. More specifically, the advance or retardation correcting signal is passed through the diode 18a or 18b and then integrated by the capacitor 18c and the resistor 18d. The comparator 18e is responsive to an integrated DC voltage in excess of a predetermined magnitude $V_1$ to produce an output at a high level which, is, in turn, applied to the AND gates 20a and 20b in the gate circuit 20.

The idling sensor 22 receives the pulsed ignition signal from the ignition signal generator 10 to sense or determine if the internal combustion engine is in the idling mode of operation. If so, the idling sensor 22 delivers an idling signal to the gate circuit 20 and the two "AND" gates 20a and 20b.

The lock signal generator 18 receives the correcting signal delivered from the phase difference detector 16 to produce an output signal only when the correcting signal has the pulse-width not less than a predetermined magnitude. Furthermore, the advance or retardation correcting signal is passed through the diode 18a or 18b and then integrated by the capacitor 18c and the resistor 18d. The comparator 18e produces a high level output in response to the integrated voltage being not less than a predetermined magnitude $V_1$. The high level output is supplied to the "AND" gates 20a and 20b in the gate circuit 20.

On the other hand, the idling sensor 22 receives the pulsed ignition signal from the ignition signal generator 10 as data for the number of rotations per unit time of the engine and thereby senses if the internal combustion engine is in the idling mode of operation. If so, the idling sensor 22 delivers an idling signal to the "AND" gates 20a and 20b in the gate circuit 20.

The gate circuit 20 then controls the passage of the correcting signal therethrough in accordance with the outputs from the idling sensor 22 and the lock signal generator 18. In other words, during the delivery of the output signal from the idling sensor 22, by sensing the idling mode in which the engine is operated, and when the comparator 18e produces the output at the high level, either one of the "AND" gates 20a or 20b is gated in order to cause the advance or retardation correcting signal from the phase difference detector 16 to pass through the gate circuit.

The advance or retardation correcting signal passed through the gate circuit 20 is applied to the pulse-width correction circuit 24. The pulse-width correction circuit 24 is operative to correct the pulse-width of the advance or retardation correcting signal with a correction factor which is different between the advance and retardation correcting signals to produce a driving pulse as will be in detail, described later.

The driving pulse is applied to either one of the transistors 26b or 26c in the reversible driving device 26 as the case may be. That transistor 26b or 26c applied with the driving pulse is turned on to rotate the reversible motor 26a in a direction as determined by the type of the correcting signal developed at that time.

During this rotation of the reversible motor 26a, the movable tap is moved along the potentiometer 28 toward the end thereof as determined by the direction of rotation of the reversible motor 26a until it is stopped and maintained at its adjusted position on the potentiometer 28 upon the decay of the driving pulse. Therefore, the poteniometer 28 generates and, by being maintained at a fixed position, effectively stores a control voltage as determined by the adjusted position of the movable tap thereon and applies the control voltage to the phase shifter 14. Thus, the potentiometer acts as a memory means.

Since the control voltage delivered from the potentiometer 28 is supplied to the phase shifter 14, the latter provides a phase retardation which is varied in accordance with the control voltage from the potentiometer 28. A change in phase retardation is operative to decrease a phase difference between the reference signal from the reference signal generator 12 and the retarded signal from the phase shifter 14.

The pulse-width correction circuit 24 is preferably of a circuit configuration as shown in FIG. 4. The illustrated arrangement comprises an advance circuit for correcting the pulse-width of the advance correcting signal developed when the retarded ignition signal is shifted toward the retarded side, and a retardation circuit for correcting the pulse-width of the retardation correcting signal developed when the retarded ignition signal is shifted toward the advanced side. Those advance and retardation circuits are identical in circuit configuration to each other except for the correcting factor. Therefore, only the advance circuit will now be described. The advance circuit includes a common emitter NPN transistor 24a having its base electrode supplied with the advance correcting signal and having its collector electrode connected to the base electrode of another common emitter NPN transistor 24b and also to a voltage point $V_B$ through a collector resistor 24c. The transistor 24b has its collector electrode connected to the voltage point $V_B$ through a charging resistor 24d and also to a parallel combination of a discharging resistor 24e and a semiconductor diode 24f. Then parallel combination 24e–24f is connected to ground through a capacitor 24g and also connected to the positive input to a comparator 24h having its negative input connected to a bias source $V_2$.

The retardation circuit comprises the components designated by the same reference numeral and characters identifying the identical components of the advance circuit and suffixed with the reference character r. For example, 24ar designates a common emitter NPN transistor having its base electrode supplied with the retardation correcting signal.

The comparators 24h and 24hr have their outputs connected to the base electrodes of the transistors 24b and 24c in the reversible driving device 26 as shown in FIG. 3.

In the arrangement of FIG. 4, it is to be noted that, when charged through the charging resistor 24d from the voltage point $V_B$, the capacitor 24g has a charging time constant smaller than that of the capacitor 24gr when charged through the charging resistor 24dr from the voltage point $V_B$ and that, when discharged through the discharging resistor 24e the capacitor 24g has a discharging time constant larger than that of the capacitor 24gr when discharged through the discharging resistor 24er.

During the closed loop control loop control effected in the idling mode of operation as described above, the correcting signal from the phase difference detector 16 will decrease in pulse-width until the integrated voltage on the capacitor 18c in the lock signal generator 18 is less than the predetermined voltage $V_1$ as shown in FIG. 6 wherein there is illustrated the dynamic characteristics of the lock signal generator 18 shown in FIG. 3. At that time, the comparator 18e in the lock signal generator 18 produces an output having a low level. This causes the gate circuit 20 to block the passage of the correcting signal therethrough, resulting in the suspension of the closed loop control. This locks a change in control signal on the potentiometer 28.

To lock the change in control voltage is advantageous in view of the durability and stable operation of the system for the following reasons: The retarded ignition signal is not completely identical in phase to the reference signal due to the irregular rotation of the internal combustion engine, fluctuations of the time period of the ignition signal developed among cylinders of multi-cylinder engines, etc. Under these circumstances, if the closed loop control continues to be effected then an unstable operation is always performed. Thus, it is preferable to prevent the control from responding to such minute shifts of the phase.

Also, when the internal combustion engine is put in any mode other than the idling mode of operation, the idling sensor 22 produces an output at a low level, and the correcting signal from the phase difference detector 16 is prevented from passing through the gate circuit 20 because the output from the lock signal generator 18 or the idling sensor 22 is at its low level. Therefore, the reversible driving device 26 is stopped from driving and controlling the potentiometer 28, but the potentiometer 28 stores and holds the control voltage at the position of the movable tap thereon adjusted through the closed loop control effected in the idling mode of operation as described above. Therefore, even when the internal combustion engine is operated in any mode other than the idling mode, the advance characteristic of the ignition signal is corrected with the correcting angle provided in the idling mode of operation thereof. This results in ignition sparks having the regular advance characteristic as shown at solid line f in FIG. 2.

Even if the ignition signal would change in angular position of occurrence thereof due to an ageing change in a route along which the associated distributor is driven, a variation in or a displacement of a position where the distributor is mounted or the like, the ignition timing is always and automatically corrected to its regular angular position relative to the reference signal which acts as a reference.

It is recalled that the pulse-width correction circuit 24 corrects the pulse-width of the correcting signal from the phase difference detector 16 so as to form a driving pulse suitable for driving the reversible motor 26a. The operation of correcting the pulse-width of the correcting signal in this way will now be described in more detail with reference to FIG. 4 and FIG. 5, wherein FIG. 5 contains illustrated waveforms developed at various points in the arrangement as shown in FIG. 4. It is assumed that, for example, the retarded ignition signal lags in phase behind the reference signal and that the transistor 24a is supplied with an advance correcting signal as shown at waveform (a) in FIG. 5 corresponding to a phase difference between those signals. Under the assumed conditions, the transistor 24b is put in its OFF state during the pulse-width of that advance correcting signal to permit the capacitor 24g to charge through the charging resistor 24d and the diode 24f from the voltage point $V_B$ as shown by the ascent of the solid waveform (b) in FIG. 5. At the end of the pulse-width of the correcting signal, the transistor 24b is turned on. This results in the charged capacitor 24g discharging through the discharging resistor 24e as shown by the descent of the solid waveform (b) in FIG. 5.

The comparator 24h compares a voltage across the capacitor 24g with the predetermined bias voltage $V_2$ (see waveform (b), FIG. 5) supplied to its negative input and converts the former to a driving pulse having a pulse-width corresponding to a time interval for which the voltage across the capacitor exceeds the predetermined voltage $V_2$ as shown by the solid waveform (c) in FIG. 5.

The retardation circuit for correcting the pulse-width of the retardation correcting signal is operated in the manner similar to that described above in conjunction with the advance circuit. Briefly, when the retardation correcting signal is supplied to the transistor 24ar, the same is converted to a driving pulse having a pulse-width corresponding to a time interval for which a voltage across the capacitor 24gr exceeds the predetermined voltage $V_2$ as shown by the dotted waveforms (b) and (c) in FIG. 5.

It will readily be understood from FIG. 5 that, since the charging and discharging time constants of the capacitor 24a are different from those of the capacitor 24ar respectively, as described above, the pulse-width of the driving pulse is corrected so that the pulse-width is considerably larger on the advance correction side than on the retardation correction side with respect to the phase difference angle $\theta$ between the reference and retarded ignition signals, as shown in FIG. 7, wherein the pulse-width of the driving pulse is plotted on the ordinate against the phase difference angle $\theta$ plotted on the abscissa. Therefore, where the retarded ignition signal lags behind the reference signal, the pulse-width correction circuit 24 has a control gain higher in the closed control effected in an advance direction or a direction to decrease the retardation than that in the closed loop control effected in a retardation direction or a direction to increase the retardation. This high control gain causes an increase in response speed. Therefore, when the phase difference is controlled in the advance direction, the lock signal from the lock to signal generator 18 (see FIG. 3) intercepts the driving pulse at a phase difference angle $(+\theta_4)$ shown in FIG. 7, after which a control region for the retardation correction is further entered over a phase difference angle $(-\theta_4)$ as shown in FIG. 7. As a result, the control is inverted in the direction to be effected toward the retardation direction with a low control gain or at a slow response speed. The control gain in the retardation direction is preliminarily selected to be low enough to prevent the control from entering the advance correction side after the lock signal has intercepted the driving pulse at the phase difference angle $(-\theta_4)$.

From the foregoing it will readily be understood that, by distinguishing the control gain on the advance correction side from that on the retardation correction side as described above, the control is always effected on the retardation correction direction immediately before the closed loop control converges. This permits a point of convergence of the control upon the completion of the closed loop control to be controlled substantially within a range of from the phase difference angle $(-\theta_4)$ to 0 as shown in FIG. 7. Accordingly a range in which the point of convergence of the control is variable can be small with respect to a change in phase difference ranging from its magnitude $(-\theta_4)$ to $(+\theta_4)$ on the assumption that the control gain remains unchanged regardless of the control direction. This results in the control with a higher accuracy.

If desired, the control gain may be higher on the retardation correction side than that on the advance correction side.

From the foregoing it is seen that the present invention is arranged to generate a reference signal at a reference angular position and an ignition signal having the advance characteristic preliminarily leading by a predetermined angle respectively, and correct the ignition signal to the regular ignition timing by controlling a retardation of the ignition signal so as to put the phase relationship between the reference signal and a retarded ignition signal resulting from the retardation of the ignition signal in a predetermined state during a predetermined mode of operation of an associated internal combustion engine. Furthermore, the present invention is enabled in the normal mode of operation of the engine to correct the ignition timing with a control magnitude stored in memory means involved. Therefore, the present invention eliminates the necessity of adjusting the initial ignition timing and also can always provide the regular ignition timing characteristic by correcting shifts of the ignition timing due to ageing changes in the components involved. Furthermore, a closed loop control system for correcting the ignition timing has a control gain in an advance control direction different from that in a retardation control direction, whereby the control is always effected in a predetermined direction immediately before the control converges and therefore, the point of convergence of the control is variable within a narrow range with respect to the phase difference. This results in a control with a high accuracy.

While the present invention has been illustrated and described in conjunction with a single preferred embodiment thereof, it is to be understood that numerous changes and modifications may be resorted to without departing from the spirit and scope of the present invention.

What is claimed is:

1. An ignition time correcting system for an internal combustion engine comprising: a reference generator means for generating a reference signal at a reference angular position of the rotation of an internal combustion engine; an ignition generator means for generating an ignition signal at an angular position of the rotation of the engine leading that for said reference signal, said ignition signal having a predetermined advance characteristic, a phase shifter means connected to said ignition generator means to control a retardation of said ignition signal in response to a control input applied thereto, an ignition means connected to said phase shifter means to generate an ignition voltage in response to an output from said phase shifter means; a first means for delivering to said phase shifter means a control signal for determining the retardation of said ignition signal due to said phase shifter means; a control means for controlling a signal supplied said first means in accordance with a phase difference between said reference signal and an output from said phase shifter means during a predetermined mode of operation of the internal combustion engine, said control means having a first control gain upon the control effected in a direction to increase the retardation of said ignition signal resulting from said phase shifter means, and a second control gain different from said first control gain upon the control effected in a direction to decrease said retardation of said ignition signal.

2. An ignition timing correcting system as claimed in claim 1, wherein said first means comprises a potentiometer.

3. An ignition timing correcting system as claimed in claim 1, wherein said control means includes: a phase difference detector for detecting a phase difference between said reference signal from said reference signal generator and an output from said phase shifter means; an idling sensor for sensing the idling mode of operation of the internal combustion engine and for delivering an idling signal; a gate circuit responsive to the delivery of said idling signal from said idling sensor only when an output signal from said phase difference detector is not less than a predetermined magnitude so as to pass said output signal from said phase difference detector therethrough; a pulse width correction circuit for correcting a pulse width of an advance or retardation correcting signal passed through said gate circuit with a correction factor, said correction factor for the advance correcting signal being different from that for the retardation correcting signal; and a driving circuit for operating said first means in response to an output from said pulse width correction circuit.

4. An ignition timing correcting system as claimed in claim 3, wherein said pulse width correction circuit comprises: a first semiconductor switching element operative upon the passage of said advance correcting signal through said gate circuit; a first capacitor responsive to the operation of said first semiconductor switching element to charge and discharge; a first charging and discharging circuit for charging and discharging said first capacitor; and a first comparator responsive to a voltage across said first capacitor when said voltage is in excess of a predetermined magnitude to deliver an output therefrom; and wherein said pulse width correction circuit further comprises: a second semiconductor switching element operative upon the passage of said retardation correcting signal through said gate circuit; a second capacitor responsive to the operation of said second semiconductor switching element to charge and discharge; a second charging and discharging circuit for charging and discharging said second capacitor; and a second comparator responsive to a voltage across said second capacitor when said voltage is in excess of a predetermined magnitude to deliver an output therefrom; said first and second charging and discharging circuits having respective charging and discharging time constants arranged so that one of said first and second charging and discharging circuits has a larger charging time constant and a smaller discharging time constant than the other of said first and second charging and discharging circuits.

* * * * *